US010783155B2

(12) United States Patent
Freimuth

(10) Patent No.: US 10,783,155 B2
(45) Date of Patent: *Sep. 22, 2020

(54) SYSTEMS AND METHODS FOR IDENTIFYING WORD PHRASES BASED ON STRESS PATTERNS

(71) Applicant: AV Music Group, LLC, Los Angeles, CA (US)

(72) Inventor: Joseph Frank Freimuth, Los Angeles, CA (US)

(73) Assignee: AV Music Group, LLC, Los Angeles, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/824,299

(22) Filed: Nov. 28, 2017

(65) Prior Publication Data

US 2018/0107666 A1 Apr. 19, 2018

Related U.S. Application Data

(63) Continuation of application No. 14/468,580, filed on Aug. 26, 2014, now Pat. No. 9,864,782.

(60) Provisional application No. 61/871,079, filed on Aug. 28, 2013, provisional application No. 61/871,865, filed on Aug. 29, 2013.

(51) Int. Cl.
*G06F 16/2457* (2019.01)
*G06F 16/332* (2019.01)
*G06F 40/247* (2020.01)
*G06F 40/268* (2020.01)
*G06F 40/274* (2020.01)

(52) U.S. Cl.
CPC ...... *G06F 16/24578* (2019.01); *G06F 16/332* (2019.01); *G06F 40/247* (2020.01); *G06F 40/268* (2020.01); *G06F 40/274* (2020.01)

(58) Field of Classification Search
CPC ............. G06F 16/24578; G06F 16/332; G06F 17/2795; G06F 17/276; G06F 17/2755; G06F 40/274; G06F 40/268; G06F 40/247
USPC ................................................. 707/723, 730
See application file for complete search history.

(56) References Cited

U.S. PATENT DOCUMENTS

| | | | | |
|---|---|---|---|---|
| 5,893,133 A * | 4/1999 | Chen | ...... | G06F 40/53 715/264 |
| 6,729,882 B2 * | 5/2004 | Noble | ...... | G09B 19/04 434/167 |
| 8,321,225 B1 * | 11/2012 | Jansche | ...... | G10L 13/027 704/258 |
| 9,159,338 B2 * | 10/2015 | Powar | ...... | G10H 1/368 |
| 2002/0024532 A1 * | 2/2002 | Fables | ...... | G06F 16/9535 715/700 |
| 2002/0150869 A1 * | 10/2002 | Shpiro | ...... | G09B 19/06 434/156 |
| 2002/0152877 A1 * | 10/2002 | Kay | ...... | G10H 1/0575 84/609 |
| 2003/0118973 A1 * | 6/2003 | Noble | ...... | G09B 19/04 434/167 |

(Continued)

*Primary Examiner* — Phong H Nguyen
(74) *Attorney, Agent, or Firm* — K&L Gates LLP

(57) ABSTRACT

The present disclosure provides systems and methods for generating matching phrases based on user-defined criteria including a desired stress pattern of a phrase. The system may determine a stress pattern based on user-defined criteria including an auditory file of a melody, and use the determined stress pattern to generate a plurality of matching phrases that include the same stress pattern.

20 Claims, 13 Drawing Sheets

(56) References Cited

U.S. PATENT DOCUMENTS

| | | | | |
|---|---|---|---|---|
| 2004/0133559 A1* | 7/2004 | DeVorzon | ............. | G06F 40/242 |
| | | | | 707/999.003 |
| 2004/0200335 A1* | 10/2004 | Phillips | ................ | G10H 1/0008 |
| | | | | 84/483.2 |
| 2004/0249629 A1* | 12/2004 | Webster | .................. | G10L 13/10 |
| | | | | 704/4 |
| 2006/0190439 A1* | 8/2006 | Chowdhury | ........ | G06F 16/3331 |
| | | | | 707/999.003 |
| 2008/0065685 A1* | 3/2008 | Frank | ..................... | G06F 16/29 |
| | | | | 707/999.102 |
| 2011/0154977 A1* | 6/2011 | Jeon | ..................... | G10H 1/0008 |
| | | | | 84/609 |
| 2011/0273455 A1* | 11/2011 | Powar | .................... | G10H 1/368 |
| | | | | 345/473 |
| 2013/0243205 A1* | 9/2013 | Wang | ..................... | G10L 19/00 |
| | | | | 381/56 |
| 2014/0039871 A1* | 2/2014 | Crawford | ............. | G06F 40/103 |
| | | | | 704/2 |
| 2015/0066921 A1* | 3/2015 | Freimuth | ............. | G06F 16/332 |
| | | | | 707/730 |
| 2018/0107666 A1* | 4/2018 | Freimuth | ............. | G06F 40/274 |

* cited by examiner

FIG. 5

| Word 1 × | Word 2 × | Word 3 × | Phrase Search | + |

Fixed Word: [____]

FILTERS

Word: [Search your value here] ● Word ○ Begins With
○ Like ○ Ends With

Syllables: [Select number of syllables ▼]

Melody: [10]

Lemma: [Search your value here] ● Lemma ○ Like

Part of Speech:
☑ Noun ☐ Verb ☐ Adverb ☐ Adjective
☐ Conjunction ☐ Preposition ☐ AuxVerb
☐ Pronoun ☐ Interjection ☐ Article Rhyme: [____]

[Apply]

About 6379 results

| Word ◆ | ID ◆ |
|---|---|
| people | 61 |
| children | 157 |
| women | 165 |
| students | 173 |
| city | 192 |
| country | 200 |
| money | 206 |
| water | 211 |
| mother | 220 |
| system | 225 |
| number | 232 |
| woman | 237 |

FIG. 6

| Word 1 × | Word 2 × | Word 3 × | Phrase Search | + |

Search Type: ○ Use Word Tab Criteria  ● Basic Phrase Search — 22

Databases to Search: ☐ All  ☐ 2 Words  ☑ 3 Words  ☐ 4 Words  ☐ 5 Words

Syllable Count: [ ]

Melody: [ 10101 ]

Contains the word: [ ]  ☐ Lemma

[Submit]

⎫
⎬ 20
⎭

| ID ▶ | Phrase |
|---|---|
| 1000 | every single day |
| 943 | any other way |
| 749 | even think about |
| 570 | any given time |
| 544 | every other day |

Word 1 × | Word 2 × | Word 3 × | Phrase Search | +

Fixed Word: she

FILTERS

Word: [Search your value here]  ⦿ Word  ○ Begins With
                                 ○ Like   ○ Ends With Syllables: [Select number of syllables ▲]

Melody: [Enter a valid Melody]

Lemma: [Search your value here]  ⦿ Lemma  ○ Like

Part of Speech:  ☐ Noun  ☐ Verb  ☐ Adverb  ☐ Adjective
                 ☐ Conjunction  ☐ Preposition  ☐ AuxVerb
                 ☐ Pronoun  ☐ Interjection  ☐ Article Rhyme: [          ]

[Apply]

Word ◆ | ID ◆
she    | 0

| Word 1 x | Word 2 x | Word 3 x | Phrase Search | + |

Search Type:  ⦿ Use Word Tab Criteria   ○ Basic Phrase Search

[Submit]

| ID ▶ | Phrase |
|---|---|
| 165 | she never got |
| 158 | she never knew |
| 142 | she never saw |
| 141 | she never said |
| 112 | she never told |

FIG. 10D

| Word 1 × | Word 2 × | Word 3 × | Phrase Search | + |

Fixed Word: [        ]

FILTERS

Word: [Search your value here]  ⊙ Word ○ Begins With
                                ○ Like  ○ Ends With Syllables: [Select number of syllables ▾]

Melody: [1]

Lemma: [Search your value here]  ⊙ Lemma ○ Like

Part of Speech:  ☐ Noun ☑ Verb ☐ Adverb ☐ Adjective
                 ☐ Conjunction ☐ Preposition ☐ AuxVerb
                 ☐ Pronoun ☐ Interjection ☐ Article Rhyme: [        ]

[Apply]

About 3790 results

| Word ◆ | ID ◆ |
|---|---|
| said | 49 |
| know | 71 |
| think | 78 |
| get | 85 |
| says | 87 |
| see | 96 |
| go | 106 |
| say | 107 |
| make | 112 |
| want | 117 |
| take | 128 |
| come | 156 |

FIG. 11

| Word 1 × | Word 2 × | Word 3 × | Phrase Search | + |

Search Type: ○ Use Word Tab Criteria  ● Basic Phrase Search

Databases to Search: ☐ All  ☐ 2 Words  ☑ 3 Words  ☐ 4 Words  ☐ 5 Words

Syllable Count: [ ]

Melody: [10101]

Contains the word: [ ]  ☐ Lemma

[Submit]

— 20

| ID ▶ | Phrase |
|---|---|
| 1000 | every single day |
| 943 | any other way |
| 749 | even think about |
| 570 | any given time |
| 544 | every other day |

| | | | | |
|---|---|---|---|---|
| a | is | that | ah | they've |
| all | it | the | aren't | til |
| am | its | their | aw | used |
| an | just | them | can't | we'd |
| and | like | there | he's | we'll |
| are | may | these | he'd | we're |
| as | me | they | he'll | we've |
| at | might | this | he's | weren't |
| be | most | those | here's | what'd |
| been | must | through | how'd | what'll |
| both | my | til | how's | what's |
| but | near | till | huh | when'd |
| by | neath | to | i'd | when's |
| can | need | up | i | where'd |
| could | no | us | i'll | where's |
| damn | none | was | i'm | who'd |
| did | nor | we | i've | who'll |
| do | of | were | it's | who's |
| does | off | when | it'd | who've |
| down | on | where | let's | whoa |
| for | once | which | oh | why'd |
| from | or | while | she's | why'll |
| had | ought | who | she'd | why's |
| has | our | whom | she'll | won't |
| have | out | whose | she's | ya |
| he | past | will | that's | yeah |
| her | shall | with | that'd | you'd |
| here | she | word | that's | you'll |
| him | should | worth | there's | you're |
| his | since | would | there've | you've |
| i | so | yes | they'd | you'd |
| if | some | yet | they'll | you'll |
| in | than | you | they're | you're |
| | | | | you've |

SYSTEMS AND METHODS FOR IDENTIFYING WORD PHRASES BASED ON STRESS PATTERNS

CROSS-REFERENCE TO RELATED APPLICATIONS

This application is a continuation of and incorporates by reference and claims the benefit of priority to U.S. patent application Ser. No. 14/468,580, filed Aug. 26, 2014, which incorporates by reference and claims the benefit of priority to U.S. Provisional Application No. 61/871,079 filed on Aug. 28, 2013, and U.S. Provisional Application No. 61/871,865 filed on Aug. 29, 2013.

BACKGROUND OF THE INVENTION

The present subject matter relates generally to systems and methods for identifying words and phrases that match a user-defined linguistic stress pattern.

Writers, lyricists, artists, and journalists, among many others, are constantly presented with the problem of brainstorming for hours over the perfect word or phrase that is missing in their work. General Internet searches for phrases is frustrating and time consuming. In addition, general Internet searches cannot be filtered or refined based on a variety of user criteria.

Further, songwriters often search for words to match a specific melody in a song. As a further complication, the best results often require the words selected to seem natural and not contradict the linguistic stress patterns (i.e., stress patterns) of natural speech. If words are chosen that contradict the natural stress pattern, the result is typically displeasing to listeners. However, finding the perfect word or phrase that matches a melody and has a natural stress pattern is difficult. Songwriters often brainstorm and search the Internet for phrases, but there isn't any system that provides a match based on the combination of the melody and the stress pattern of the word or phrase.

Accordingly, there is a need for systems and methods directed to providing writers with the perfect phrase for their work in an efficient manner, as described and claimed herein.

BRIEF SUMMARY OF THE INVENTION

The present disclosure provides systems and methods for identifying words and phrases to match a user-defined stress pattern. Various examples of the systems and methods are provided herein.

In one example, the system is configured to search for phrases that match a user's defined criteria, such as a stress pattern. As used herein, a phrase is defined as including at least one word. For example, the user may define search criteria regarding the sought after phrase into the system. In response, the system returns a plurality of phrases that meet the defined criteria. The returned results may take many forms, but in one example, the results are ranked according to frequency of use, thereby allowing users to easily identify the most popular matches.

The user-defined search criteria may include, for example, defined stress pattern, number of syllables, number of words, beginning letter of the phrase or word, and/or part of speech, among others. The criteria may also include a pre-defined word or phrase fragment. For example, a user may be looking for a three-word phrase, wherein the user knows the second word, and provides the second word as part of the criteria. The criteria may also include "rhymes with" limitations, or "attitude" limitations (i.e., sentiment limitations) of the phrase or words, among other limitations.

The system includes a controller in communication with a database, wherein the database includes a plurality of words and phrases having corresponding stress patterns. The system may constantly update the database based on a plurality of phrase sources. For example, the system may be in communication with a phrase source including song lyrics, books, short stories, poems, social media, articles, newspapers, websites, among other text-based references, wherein the system imports new words and phrases into the database and determines and/or tracks related statistics, such as the frequency of use of the phrases (e.g., frequency rating).

The plurality of words within the database may also include associated pronunciation data. In such example, the plurality of words may be organized such that every word is indexed by the pronunciation data. It is understood that many words have multiple pronunciations and the system is adapted to index each alternative pronunciation. The pronunciation of each word and the stress pattern of each word may be processed by the system during the searching process.

The system may produce search results based on the entirety of the phrase, or on individual words within a phrase and combine the separate word search results into a complete phrase.

This disclosure further provides a method wherein a user defines search criteria, which may include any combination of; the number of words in the phrase, the desired stress pattern of each word in the phrase, the desired part of speech, the first letter of the phrase, rhyming limitations, attitude limitations, or combinations thereof. The system identifies phrases that match the user-defined stress pattern and filters the search results based on the user-defined criteria. The system may search written English language phrase databases for every possible combination of the filtered stress pattern matches. The system may further display the search results and corresponding rank based on the phrase popularity, which may be determined by the frequency rating of the phrase.

In an embodiment, the system for identifying a desired phrase, the system includes a controller and a memory coupled to the controller, wherein the memory is configured to store program instructions executable by the controller. In response to executing the program instructions, the controller is configured to receive user-defined criteria through a user interface, wherein the user-defined criteria includes a stress pattern for at least a portion of a phrase. The controller is also configured to (i) access a database including a plurality of phrases, wherein each phrase includes at least one word, wherein each phrase is associated with a stress pattern, (ii) select a matching phrase from the plurality of phrases within the database, wherein the matching phrase is associated with a stress pattern that matches the received user-defined criteria, and (iii) display the matching phrase on the user interface.

In an example, the user-defined criteria includes a word number associated with the number of words in the desired phrase. The user-defined criteria may include a rhyme type, wherein the rhyme type is selected from the group consisting of perfect, additive, family, subtractive, assonance, and consonance.

The controller may be configured to calculate a ranking for the matching phrases, wherein the ranking is based on a frequency of occurrence of the matching phrase in the database.

The stress pattern is in the form of a first indicia and a second indicia, wherein the first indicia is associated with a stressed syllable and the second indicia is associated with an unstressed syllable. In an example, the stress pattern may be in the form of at least two integers, wherein a first integer is associated with a stressed syllable and a second integer is associated with an unstressed syllable. The stress pattern may include at least three integers, wherein a first integer is associated with a primary stressed syllable, a second integer is associated with an unstressed syllable, and a third integer is associated with a secondary stressed syllable.

In an example, the controller is further configured to receive the stress pattern in the form of an auditory sample, convert the auditory sample into MIDI values, and determine the stress pattern associated with the MIDI values.

The controller may be configured to (i) access a plurality of phrase sources each including a plurality of phrases, wherein each plurality of phrase includes at least one word, (ii) identify a stress pattern for each of the plurality of phrases, calculate a frequency of occurrence of each phrase in the plurality of phrases, and (iii) input the identified plurality of phrases, the associated frequency of each phrase, and the associated stress pattern of each phrase into the database.

In an embodiment, the system for identifying a desired phrase, the system includes a controller, a memory coupled to the controller, wherein the memory is configured to store program instructions executable by the controller. In response to executing the program instructions, the controller is configured to receive user-defined criteria through a user interface, and determine a stress pattern associated with the user-defined criteria. The controller is also configured to access a database including a plurality of phrases, wherein each phrase includes at least one word, wherein each phrase is associated with a stress pattern, select a matching phrase from the plurality of phrases within the database, wherein the matching phrase is associated with a stress pattern that matches the received user-defined criteria, and display the matching phrase on the user interface.

In an example, the user-defined criteria includes a submitted phrase, wherein the submitted phrase includes at least one word. In another example, the user-defined criteria is an auditory sample, wherein the controller is configured to convert the auditory sample into MIDI values to determine the stress pattern of the user-defined criteria.

An advantage of the present systems is the ability to search for phrases that match a user-defined melody and/or stress pattern.

An advantage of the present systems and methods is that the system may identify phrases that would otherwise elude users in an efficient manner.

A further advantage of the present systems and methods is that the system may provide search results based on stress patterns and pronunciation of each word in a phrase.

Yet another advantage of the present system is the ability to find, collect, and organize words and phrases based on melodies and stress patterns for writers, copywriters, songwriters, poets, and computer programs.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is an example of a user interface for inputting user-defined criteria.

FIG. 6 is an example of a user interface including input of user-defined criteria and a plurality of matching phrases.

FIGS. 10A-10D is a series of user interfaces including various displays for inputting user-defined criteria, a display of the corresponding matching phrases, and a user interface for further refining of the search results of the matching phrases.

FIG. 11 is an example of a display on a user interface including a user-defined stress pattern and corresponding matching phrases.

FIG. 13 is a list of words that may be associated with an unstressed stress pattern in the database.

DETAILED DESCRIPTION OF THE INVENTION

Figure 1:
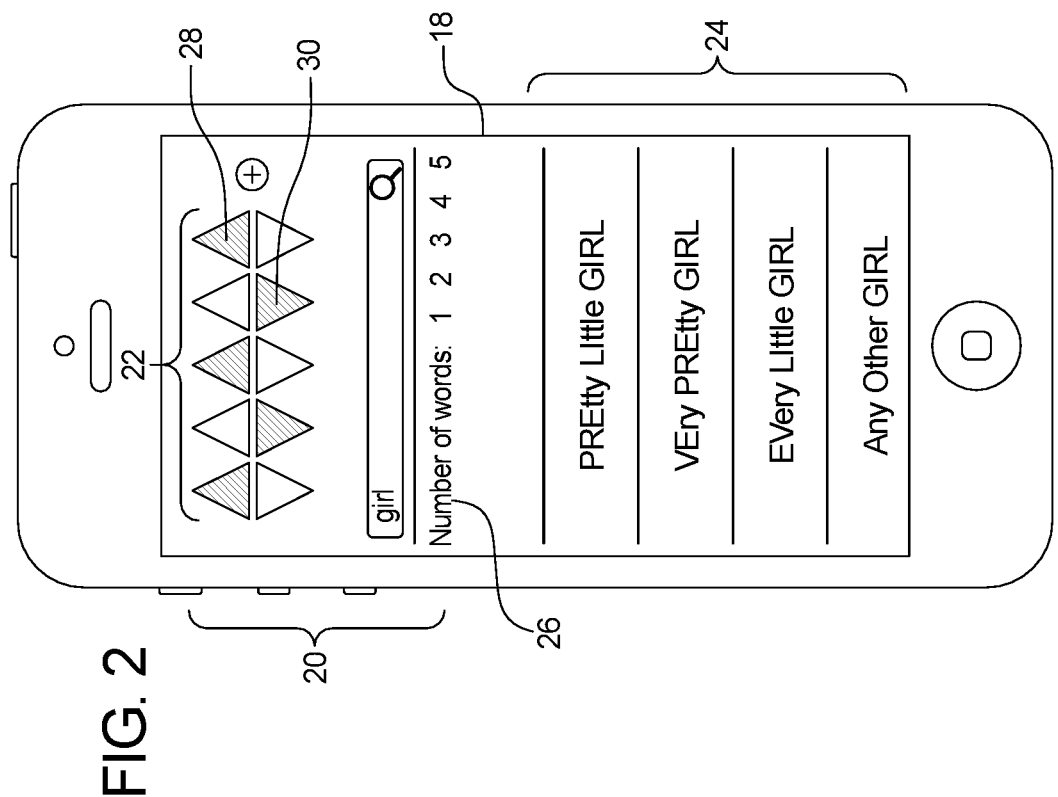
FIG. 1 is a schematic of the system disclosed herein.

The present disclosure provides systems and methods for identifying words and phrases that match a user-defined stress pattern.

The system 10 includes a controller 12 and a memory 14 coupled to the controller 12, wherein the memory 14 is configured to store program instructions executable by the controller 12. In response to executing the program instructions, the controller 12 is configured to receive user-defined criteria 20 through a user interface 18, wherein the user-defined criteria 20 includes a stress pattern 22 for at least one word within the matching phrase 24. The user-defined criteria 20 may also include a word number 26 associated with the number of words in the matching phrase 24.

The user-defined criteria 20 may include the stress pattern 22 of at least one word within the matching phrase 24. The stress pattern 22 of a word indicates the relative stress of each syllable. For example, stressed syllables 28 are typically emphasized (e.g., louder, longer, and/or higher) than unstressed syllables 30. The stressed syllables 28 may be further designated by a primary stressed syllable and a secondary stressed syllable. In an example, the stress pattern 22 may be indicated by a combination of integers. For example, for a three-syllable word, the unstressed syllable 30 may be associated with a value of zero, the primary stressed syllable may be associated with the value of one, and the secondary stressed syllable may be associated with the value of two. However, it should be understood than any suitable indication, such as letters, numbers, colors, among others, may be used to represent the stress pattern 22.

Figure 2:
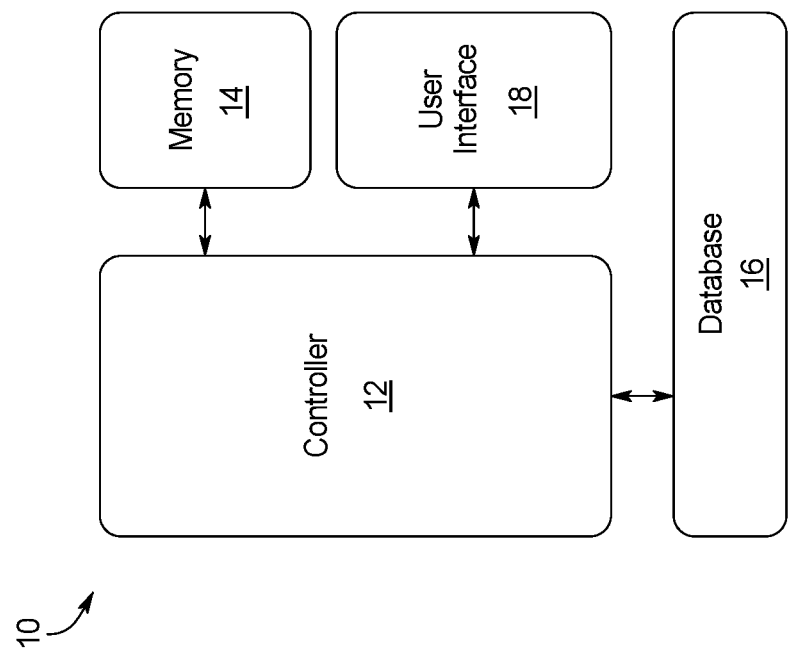
FIG. 2 is an example of a display on a user interface including user-defined criteria and corresponding matching phrases.

In order to initiate a search, the desired stress pattern 22 may be indicated by a user via a user interface 18 by a first indicia for stressed syllables 28, and a second indicia for unstressed syllables 30, as shown in FIG. 2. Of course any visual indication for the first and second indicia may be associated with stressed syllables 28 and unstressed syllables 30, including, but not limited to, plus and minus signs, upward and downward arrows, upward and downward triangles, pronunciation symbols, upper and lower case letters, different fonts, different size fonts, among others. In another example, the user-defined criteria 20 may be entered through the user interface 18 by moving virtual switches up and down to denote stressed syllables 28 and unstressed syllables 30. In yet another example, the user-defined criteria 20 may be selected through a user interface 18 by entering "dum" and "da" into a text field for stressed syllables 28 and unstressed syllables 30, respectively. Further, a drop down menu of user criteria may be included on a user interface 18. For example, a drop down menu may include the integers "0", "1", and "2" to denote the stressed syllables 28 and unstressed syllables 30. Drop down menus may also be used for the upward and downward triangles to indicate the stress pattern 22, as well as the "dum" and "da" combination of stress patterns.

Figure 3:
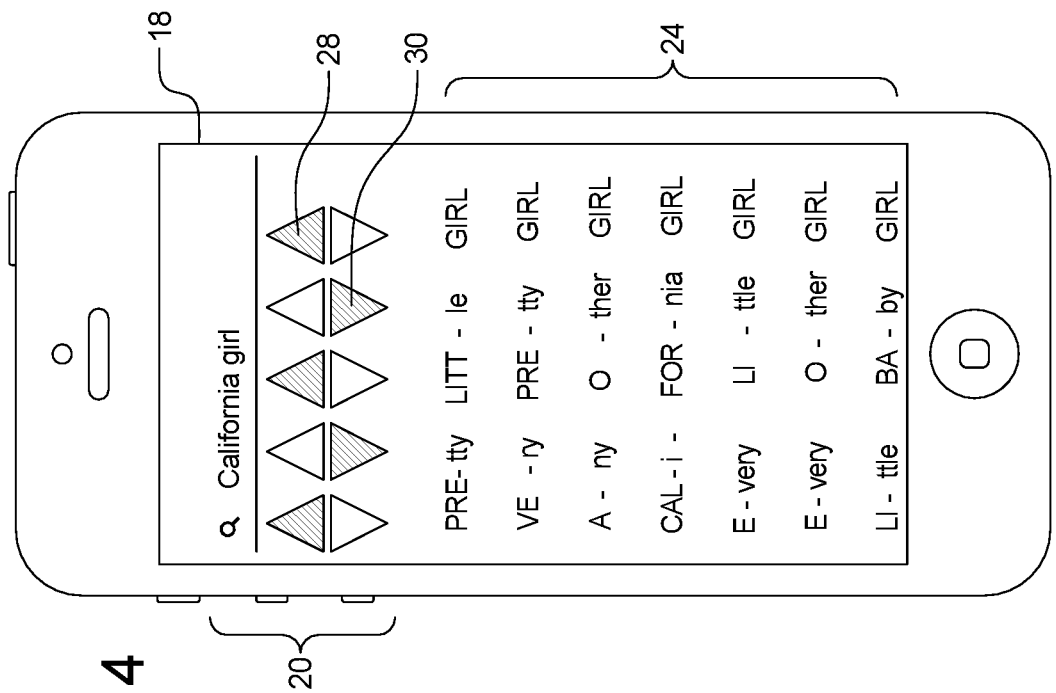
FIG. 3 is an example of a display on a user interface including an input mechanism for a user-defined stress pattern in the form of an auditory file.

The user-defined criteria 20 may be input or selected by "playing" a melody's stress pattern 22 on a user interface 18 using any of the binary symbols described above. For example, as shown in FIG. 3, the user may play a stress pattern 22 melody by selecting up and down triangles. The pattern input by the user may be used as the user-defined criteria 20.

Figure 4:
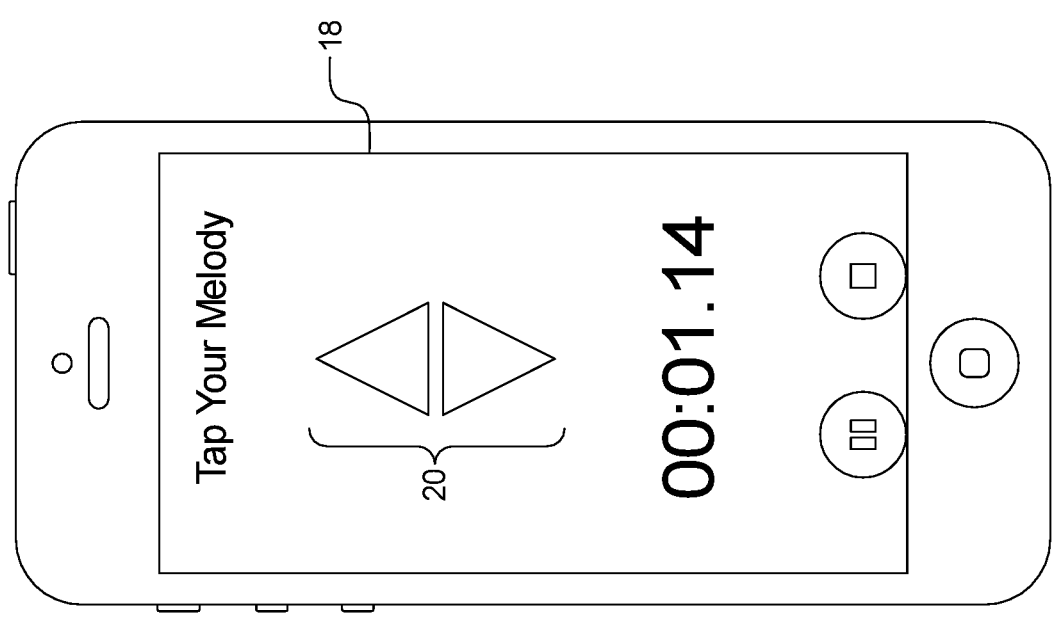
FIG. 4 is an example of a display on a user interface including a user-defined stress pattern and corresponding matching phrases.

As shown in FIG. 4, the stress pattern 22 of the phrase "California Girl" may be indicated by an up arrow for the stressed syllable 28 (or primary syllables) of "Cal", "forn", "girl" and the unstressed syllables 30 of "li" and "ia." The user-defined criteria 20 of stress patterns 22 may be entered with the primary or stressed syllables 28 indicated by capital letters and the unstressed syllables 30 indicated in lower case letters. For example, the stress pattern 22 of the phrase "pretty little girl" may be indicated by "PREtty LITTle GIRL."

As shown in FIG. 5, the user-defined criteria 20 may include more than a selected stress pattern 22. For example, the system 10 may include displaying a plurality of search filter options on the user interface 18. The system 10 may use the information input by the user to return matching phrases that include the requested stress pattern 22 as well as any number of other user-defined criteria 20.

For example, the user-defined criteria 20 may also include the first (or last) letter, or the first few letters, of at least one word within the matching phrase 24. For example, a user may enter the first letter of a word in the phrase via a dropdown menu of an alphabet displayed on the user interface 16 or within a text entry box. In addition, the user-defined criteria 20 may include a word ending, such as "5", "ed", "ing", "ly", among others. The user-defined criteria 20 may also include the part of speech of at least one word. For example, the part of speech may include verb, adverb, noun, adjective, auxiliary verb, conjunction, pronoun, preposition, qualifier, interjection, or article, among others. The user-defined criteria 20 may include multiple parts of speech. For example, the user may select both "verbs" and "adverb" to search both parts of speech simultaneously.

In addition, the user-defined criteria 20 may include an attitude indication for the phrase. For example, each of the plurality of phrases in the database 16 may be associated with an associated conveyed attitude, e.g., positive, negative, neutral, moderate, or intense.

The user-defined criteria 20 may also include a rhyming limitation and/or the type of rhyming. For example, the user may specify the phrase include a perfect, additive, family, subtractive, assonance, and/or consonance rhyme. The user may also input a word or phrase with which the matching phrase 24 must rhyme.

In addition, the user-defined criteria 20 may include the input of a similar phrase or word. For example, a user may enter a first phrase for which the resulting phrase returned by the system will be similar. The similarity may be based on the stress pattern 22, sound, subject matter, concept, rhyme, letters, among other criteria.

The controller 12 is configured to access a database 16 including a plurality of phrases, wherein each phrase includes at least one word, wherein each word is associated with a stress pattern 22. The controller 12 may be configured to access a plurality of phrase sources each including a plurality of phrases, wherein each plurality of phrases includes at least one word. The controller 12 may be configured to identify a stress pattern for each word or in the plurality of phrases and input the identified plurality of phrases and the associated stress pattern 22 of each word into the database 16.

The controller 12 may be in communication with a plurality of phrase sources including, and not limited to, dictionary, thesaurus, song lyrics, books, short stories, poems, social media platforms, articles, newspapers, and websites, among other text based references. The system 10 may import new words and phrases into the database 16. As a result, the system 10 maintains the database 16 with up to date colloquial language and new phrases from around the world. If the system 10 finds a phrase already in the database 16, the controller 12 does not import the phrase again but increases the frequency value associated with the popularity of the matching phrase 24. The controller 12 may also import the date, time, and phrase source associated with each of the plurality of phrases in the database 16.

Each phrase within the database 16 may be indexed by the stress pattern 22 of each word contained in the phrase as well as the cumulative stress pattern 22 for each phrase containing more than one word. In spoken English, one syllable words are considered stressed. However, in singing and songwriting, words that are organizational, structural, or non-meaningful are commonly unstressed, even though they may be only one syllable. For example, conjunctions, articles, prepositions, pronouns, contractions, and interjections such as "oh" and "yeah" are categorized as unstressed in the database 16. FIG. 13 includes a list of words that have only one syllable that is denoted in database 16 as an unstressed syllable 30. Further, many words are sung with a different number of syllables than if the word is spoken. For example, the word "every" has three syllables with spoken, and typically two syllables when sung. As a result, the database 16 includes the pronunciation of words for both spoken and sung, and the user-defined criteria 20 may specify which pronunciation the user requests. The database 16 also includes the syllabification of each phrase, such than hyphens are placed between each syllable to display to the user.

The database 16 may include a plurality of phrases that may be indexed by several parameters in addition to an associated stress pattern 22. For example, the plurality of phrases may be organized alphabetically, by pronunciation, the ending of each word, rhyming words may be grouped together, synonyms may be grouped together, etc. For example, each phrase may be indexed by part of speech, rhyme, rhyme type, age group and other demographic information of people who typically use the word, tone (e.g., harsh, kind, positive, negative), difficulty of vocabulary, mention of brand names, type of imagery, hyphenation, syllabification, syllable count, number of words, number of times the phrase occurs in the database 16, and/or the phrase source associated with the phrase, among others.

The user-defined criteria 20 may include a phrase source. For example, the user may filter a search based on particular phrase sources. The system 10 may filter the matching phrase 24 based on who said the phrase, where it was said, the demographic of who said it (age, race, location, gender, etc.), and the type of phrase source (person, book, article, song, publications, cinema, among others).

In an example, the controller 12 is configured to calculate a frequency of occurrence in the phrase sources for each word in the plurality of phrases. As such, upon searching the database 16, the controller 12 presents a matching phrase 24 to the user based on the user-defined criteria 20 and the associated frequency. In other words, the controller 12 is configured to display the matching phrases 24 based on the frequency or popularity of the phrase with the plurality of phrase sources. In another example, the controller 12 is configured to calculate a ranking for each matching phrase, wherein the ranking is based on the frequency of occurrence within the database 16. In other words, the ranking is a relative ranking compared to the words within the database 16. In addition, frequency and/or ranking may be entered as a user-defined criteria 20. For example, if the user would like phrases of a certain popularity, the user can request (via user-defined criteria 20) matching phrases 24 for phrases that are ranked 50-100 in terms of ranking within the database 16.

The user-defined criteria 20 may include a type of alliteration. For example, the user may define the number of words that are requested to start with the same letter, as well as the defined letter. The user-defined criteria 20 may also include types of consonants: plosives, fricatives, and nasals, among others.

The controller 12 is also configured to select a matching phrase 24 from the plurality of phrases within the database 16, wherein the matching phrase 24 includes a stress pattern 22 that matches the received user-defined criteria 20.

Figure 7:
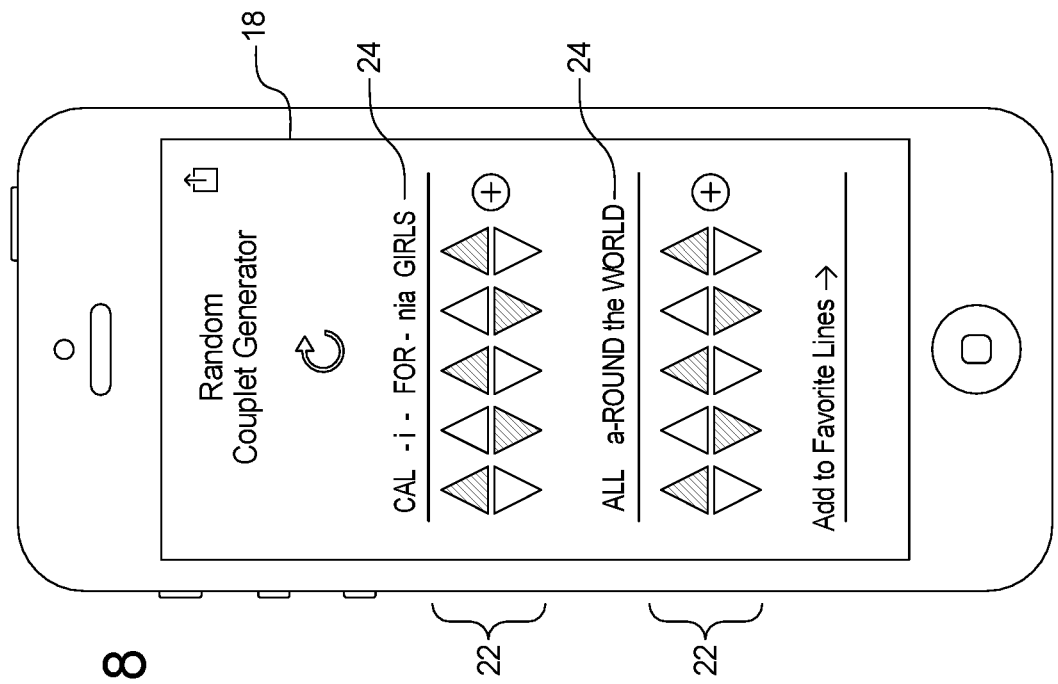
FIG. 7 is an example of a display on a user interface including a user-defined stress pattern, and a user-defined word to be contained in the results, and corresponding matching phrases.

The controller 12 is also configured to display the matching phrase 24 on a user interface 18. The display may include a list of matching phrases 24, as shown in FIG. 6. The display may include the visual methods above including upward and downward triangles and/or the phrases written such that capital letters denote the stressed syllables 28 and lower case letters for unstressed syllables 30, as shown in FIG. 7. The stressed syllables 28 may be displayed in a bold font and the unstressed syllables 30 may be displayed in a normal font. Of course, other fonts, colors, and size may indicate stressed syllables 28 and unstressed syllables 30.

Figure 8:
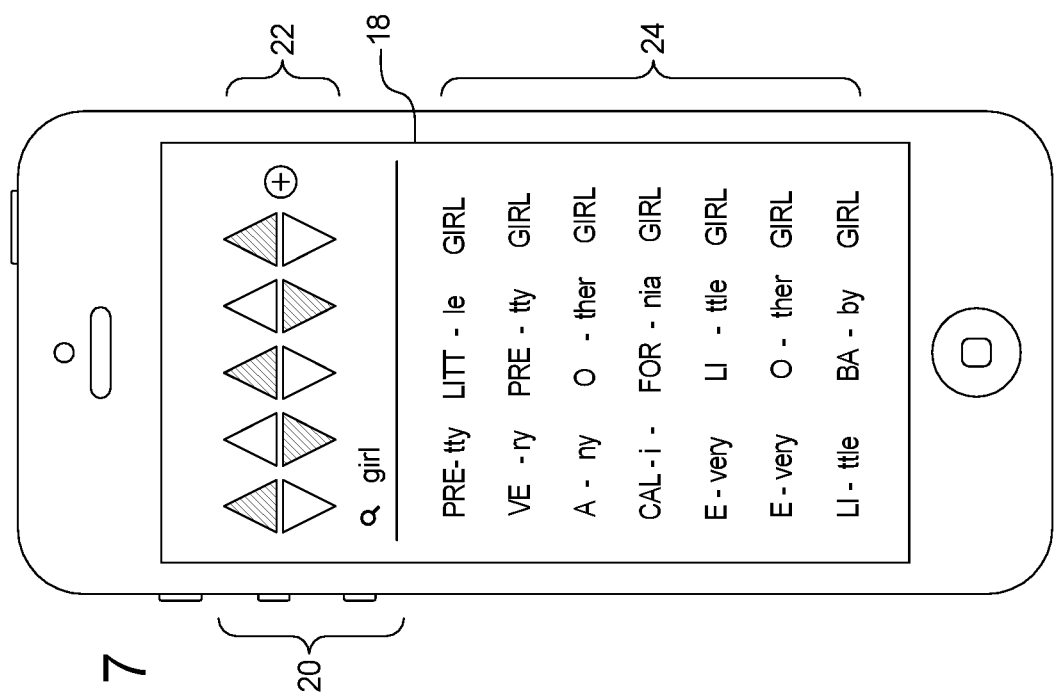
FIG. 8 is an example of a display on a user interface including two user-defined stress patterns and corresponding matching phrases.

The system 10 may display two matching phrases 24 that match the user-defined criteria 20 and automatically rhymes the last word such that the user may see randomly generated rhyming couplets, as shown in FIG. 8. For example, the displayed matching phrase 24 results may include a number of lines to compose a stanza. The system 10 may randomly generate lines with the ability to set rhyme and stresses for each line.

Figure 9:
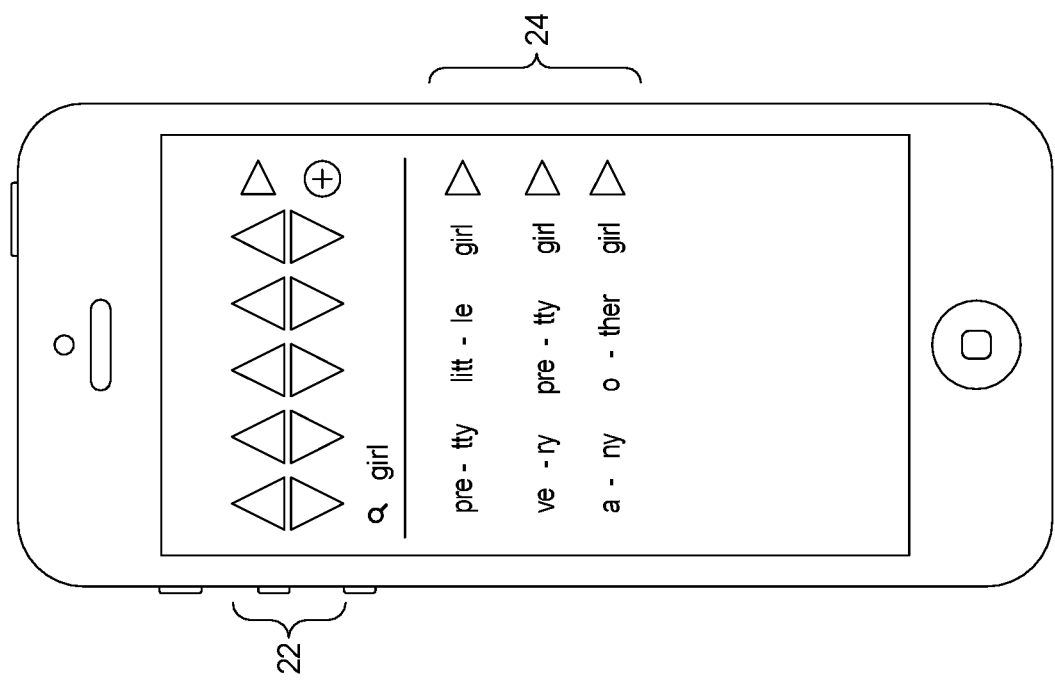
FIG. 9 is an example of a display on a user interface including a user-defined stress pattern and corresponding matching phrases, wherein the matching phrases include a prompt to play an auditory file associated with the matching phrase.
Figure 10B:
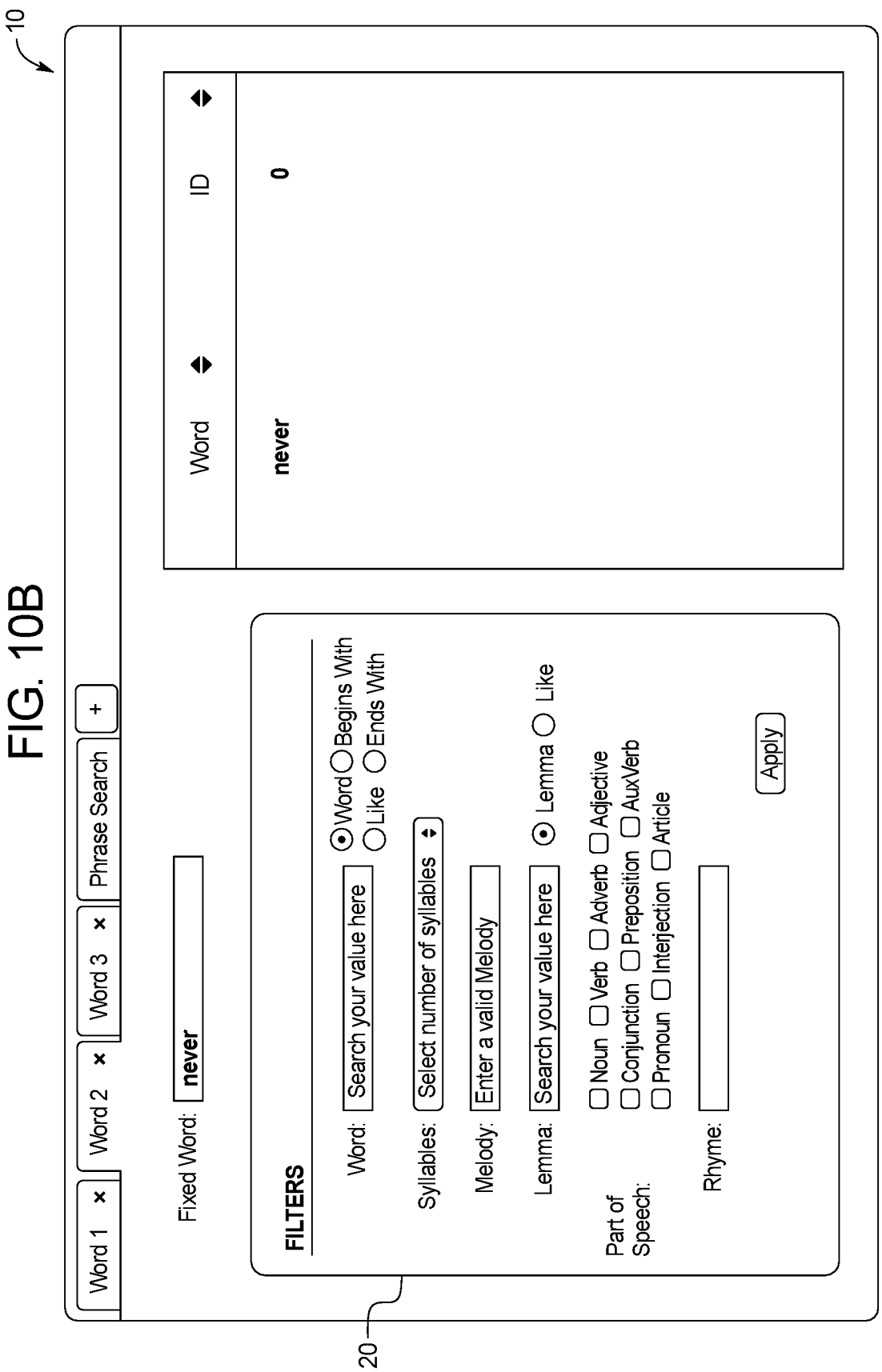

The system 10 may display the matching phrases 24 with an option for the user to play the associated auditory file of the matching phrase 24, as shown in FIG. 9. For example, the user may press a play button on the user interface 16 to hear the stress pattern 22 of the matching phrase 24. The user may also change the color of the words as the system 10 is playing the auditory file of the matching phrase 24 to change the stress pattern 22.

FIGS. 10A-10D depict a series of user interfaces 16 for receiving user-defined criteria 20. For example, the user may define the number of words in a phrase, the desired stress pattern 22 of each word in the phrase, and any other user-defined criteria 20 that filters the words with desired stress patterns 22. For example, the controller 12 may receive user-defined criteria 20 for each word within a phrase. For example, each word within a phrase may have its own tab for which a user may select to enter the user-defined criteria 20 for that word. The user may press a displayed "search" on the word search tab of the system 10 to find matching word with the selected stress pattern 22 and user-defined criteria 20, and the system 10 may rank the results by popularity. The system 10 may then combine and analyze the individual search results for each word to create the phrase matches 24. Alternatively, or in addition to, the user may enter user-defined criteria 20 for an entire phrase (in contrast to each word individually), the system 10 searches written English language n-gram databases for every possibly combination of matching phrases 24. Based on the search results of matching phrases 24, the system 10 may display each phrase candidate and ranks the phrase based on its popularity, or by any other user-defined criteria 20 that the user-defined. The system 10 may further refine the matching phrases 24 search results by any number of the user-defined criteria 20 discuss above. The search results of matching phrases 24 may be filtered any number of iterations.

In another example, the user may select the system 10 to search a gram database based on pronunciation, without individual word filters and without specifying the number of words in the gram or phrase, as shown in FIG. 11. For example, the user-defined criteria 20 may include a stress pattern 22 in a binary form, such as 01001. The system 10 may search all 2, 3, 4, and 5 word phrases or grams for any grams with a 01001 stress pattern 22. The controller 12 may be configured to search the database 16 for matching phrases 24 the defined stress pattern 22, no matter how many words are in the phrases. The user-defined criteria 20 may include the total number of syllables the resulting matching phrases 24 should contain. Further, the search results of the matching phrases 24 may be further filtered or searched to contain a specified word or words. The user-defined criteria 20 may include an "include lemma" option that may be selected for the controller 12 to return matching phrases 24 (or grams) that even contain lemma of the search word criteria. For example, a user may enter the word "kid" in the "contains the word(s)" to search for all grams that contain the word "kid" and its lemma, such as "kids", "kidded", and "kidding", among others.

In another example, the controller 12 may receive a user-defined criteria of a submitted phrase, wherein the phrase contains at least one word. The controller 12 analyzes the phrase to determine a stress pattern associated with the submitted phrase. In other words, the user does not need to input the stress pattern, instead the controller 12 analyzes the submitted phrase to determine the stress pattern 22. The controller 12 may be configured to display the determined stress pattern 22 of the submitted phrase in any of the methods described above, such as upward and downward triangles, integers, letters, or any other visual display that communicates the stress pattern 22. The controller 12 is also configured to select a matching phrase 24 from the plurality of phrases within the database 16, wherein the matching phrase 24 includes a stress pattern 22 that matches the stress pattern 22 of the received user-defined criteria 20.

In such example, the controller 12 may determine more than one possible stress pattern 22 associated with the submitted phrase from the user. In such case, the matching phrases 24 may be grouped by stress pattern 22. For example, the controller 12 may display matching phrases 24 associated with a first stress pattern associated with the submitted phrase, and display a separate set of matching phrases associated with a second stress pattern associated with the submitted phrase.

In yet another example, the controller 12 may receive an auditory sample through a user interface 18 wherein the user may sing, hum, play, tap, or type a melody and stress pattern 22. For example, the user may record herself or someone else singing, playing an instrument, or tapping a stress pattern 22. In such case, the controller 12 is configured to analyze the auditory sample to determine a stress pattern 22 associated with the auditory sample. The controller 12 may be configured to display the determined stress pattern 22 in any of the methods described above, such as upward and downward triangles, integers, letters, or any other visual display that communicates the stress pattern 22.

In an example, the controller 12 determines the stress pattern 22 of the auditory sample by converting the auditory sample into a MIDI (musical instrument digital interface) value. Of course, the MIDI values may be imported directly from a user, instead of the user playing the melody or entering the melody through a user interface 18.

The controller 12 analyzes the MIDI to determine the stressed and unstressed portions of the melody. The strong and weak (stressed and unstressed) stresses of the melody is determined by considering several variables of the auditory sample including, but not limited to, the volume, amplitude of the waveform, the number of notes, the duration of the notes, the length of the sample, note articulation, location within a phrase, note pitch relative to other notes, the key of the overall melody and where each note fits into the key, the number of times the note occurs, the beat that the melody falls on, the tempo of the melody, the height of the note before and after, and the amplitude of the notes surrounding the note at issue.

In addition to determining a matching phrase 24 based on user-defined criteria 20 for a single desired phrase, the system 10 may determine matching phrases 24 for two or more phrases at a time. For example, the system 10 may search the database 16 for two or more matching phrases 24 with the same stress pattern 22 as indicated by the user-defined criteria 20. The two or more matching phrases 24 may be further refined by requiring the last words of each phrase to rhyme with each other to create rhyming couplets.

Figure 12:
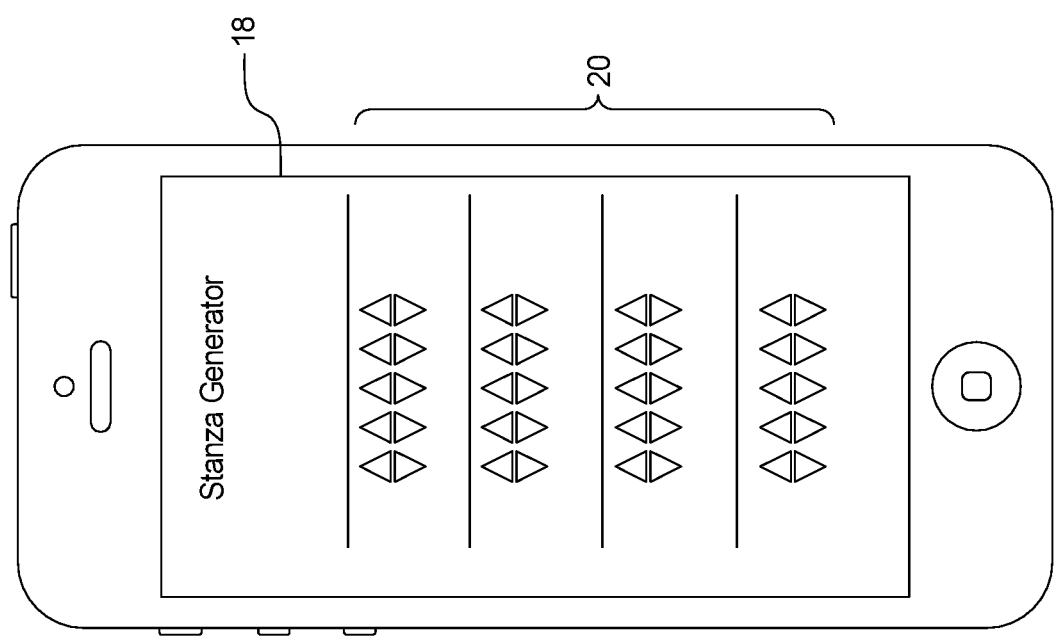
FIG. 12 is an example of a display for inputting user-defined criteria including stress patterns for a four-line stanza.

In an example, the system 10 may be configured to search for four phrases at a time with an ABAB rhyme pattern and a 4 3 4 3 stress pattern 22, wherein the number denotes the number of strong stresses in each phrase. As shown in FIG. 12, the user-defined criteria 20 may include a stress pattern 22 for each line of the four line stanza. The user may enter the stress pattern 22 of each line by selecting upward and downward triangles, as shown in FIG. 12.

The system 10 may include a user-defined criteria 20 wherein the user indicates that the two or more matching phrases 24 include a dovetail feature. For example, if the user-defined criteria 20 includes a two word overlap, the controller 12 may determine all matching phrases 24 where the last two words of the first phrase are the same as the first two words of the second phrase, and may display the combination of those two phrases as a single phrase.

The system 10 may also include determining matching phrases 24 that contain synonyms to words within the user-defined criteria 20. In such example, the database 16 includes synonyms and antonyms associated with the word and plurality of phrases within the database 16. Alternatively, or in addition to, the controller 12 may be in communication with a thesaurus source that may be used to determine matching phrases 24 with similar meanings to the user-defined criteria 20 including desired words.

The system 10 may include an autocomplete function wherein, when a user types in a first word of a phrase, the system 10 may display the most common completions of the query automatically. For example, the user may type in "people always" and the system 10 may automatically display "say," "ask," "want," and "think" as options to complete the phrase, as those phrases are the most common verbs in the database 16 that follow "people always." The user may also change a setting for the predictive text to favor more obscure phrase completions by setting the range of frequencies or rankings within the database 16. For example, the user may specify the predictive text to show only results that rank between 50-100 in terms of frequency in the database 16.

The user-defined criteria 20 may include various specialized characters to denote particular search methods. For example, the user may enter "buy a ?" and the system 10 may return matching phrases 24 that may include "buy a house." An ellipses in the user-defined criteria, such as "buy . . . house," indicates to the system 10 to return words that would fill in the phrase, such as "buy a new house." A "#" in front of a word indicates the system 10 to search for similar words using a thesaurus to find synonyms of the word. For example, "she loves #dogs" may yield matching phrases 24 results such as "she loves canines" and "she loves puppies." A "*" may indicates a wildcard search that indicates anything between the two "*".

The system 10 may also include an inspirational feed, which displays text and photos from the internet related to the user's search. For example, if the user inputs a search for "sunshine," then the system 10 may return tweets and photos from the internet tagged as "sunshine" display in the inspiration feed.

The system 10 also includes several methods for collecting, organizing, and sharing word and matching phrase 24 search results. For example, the system 10 may create, save, and organize matching phrases 24, stanzas, and songs, which are essentially files that the user may store and access at any time. The system 10 may export and share the saved files in various formats including text documents, word documents, google documents, spreadsheets, excel documents, and PDF documents. The system 10 may share the documents via email, social media platforms, among others.

The system 10 is also configured to track the user, time, location, search terms, and results of all searches, such that administrators can monitor what searches are most popular so that the software can be improved over time. The system 10 also records the phrases it served so that after a song is written, the user can determine how much co-writing credit the present system 10 deserves.

As mentioned above and schematically shown in FIG. 1, aspects of the systems 10 and methods described herein are controlled by one or more controllers 12. The one or more controllers 12 may be adapted to run a variety of application programs, access and store data, including accessing and storing data in the associated databases 16, and enable one or more interactions as described herein. Typically, the controller 12 is implemented by one or more programmable data processing devices. The hardware elements, operating systems, and programming languages of such devices are conventional in nature, and it is presumed that those skilled in the art are adequately familiar therewith.

For example, the one or more controllers 12 may be a PC based implementation of a central control processing system utilizing a central processing unit (CPU), memory 14 and an interconnect bus. The CPU may contain a single microprocessor, or it may contain a plurality of microprocessors for configuring the CPU as a multi-processor system. The memory 14 may include a main memory, such as a dynamic random access memory (DRAM) and cache, as well as a read only memory, such as a PROM, EPROM, FLASH-EPROM, or the like. The system may also include any form of volatile or non-volatile memory 14. In operation, the memory 14 stores at least portions of instructions for execution by the CPU and data for processing in accord with the executed instructions.

The one or more controllers 12 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 12 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces 30 for the controller 12. For example, the one or more controllers 12 may include a graphics subsystem to drive the output mechanism. The links of the peripherals to the system may be wired connections or use wireless communications.

Although summarized above as a PC-type implementation, those skilled in the art will recognize that the one or more controllers 12 also encompasses systems such as host computers, servers, workstations, network terminals, and the like. Further one or more controllers 12 may be embodied in a device, such as a mobile electronic device, like a smartphone or tablet computer. In fact, the use of the term controller 12 is intended to represent a broad category of components that are well known in the art.

Hence aspects of the systems and methods provided herein encompass hardware and software for controlling the relevant functions. Software may take the form of code or executable instructions for causing a controller 12 or other programmable equipment to perform the relevant steps, where the code or instructions are carried by or otherwise embodied in a medium readable by the controller 12 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 12 can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and system may be provided based on various combinations of the features and functions from the subject matter provided herein.

We claim:

1. A system for identifying a desired phrase, the system comprising:
 a controller;
 a memory coupled to the controller, wherein the memory is configured to store program instructions executable by the controller;
 wherein in response to executing the program instructions, the controller is configured to:
 receive user-defined criteria through a user interface, wherein the user-defined criteria includes a stress pattern for at least a portion of a phrase, wherein the stress pattern indicates a relative stress of each syllable of the at least a portion of the phrase, wherein the phrase includes more than one word,
 wherein at least one of one syllable articles, one syllable conjunctions, one syllable prepositions, one syllable pronouns, one syllable contractions, and one syllable interjections in the phrase are unstressed in the stress pattern;
 access a database including a plurality of phrases, wherein each phrase includes at least one word, wherein each phrase is associated with a stress pattern;
 select a matching phrase from the plurality of phrases within the database, wherein the matching phrase is associated with a stress pattern that matches the received user-defined criteria; and
 display the matching phrase on the user interface.

2. The system of claim 1 wherein one syllable conjunctions, one syllable prepositions, and one syllable pronouns in the phrase are unstressed in the stress pattern.

3. The system of claim 1 wherein one syllable contractions, and one syllable interjections in the phrase are unstressed in the stress pattern.

4. The system of claim 1 wherein the user-defined criteria includes a word number associated with the number of words in the desired phrase.

5. The system of claim 1 wherein the controller is configured to calculate a ranking for the matching phrases, wherein the ranking is based on a frequency of occurrence of the matching phrase in the database.

6. The system of claim 1 wherein the user-defined criteria includes a rhyme type, wherein the rhyme type is selected from the group consisting of perfect, additive, family, subtractive, assonance, and consonance.

7. The system of claim 1 wherein the stress pattern is in the form of at least two integers, wherein a first integer is associated with a stressed syllable and a second integer is associated with an unstressed syllable.

8. The system of claim 1 wherein the controller is further configured to
receive the stress pattern in the form of an auditory sample,
convert the auditory sample into musical instrument digital interface values; and
determine the stress pattern associated with the musical instrument digital interface values.

9. The system of claim 1 wherein the stress pattern is in the form of a first indicia and a second indicia, wherein the first indicia is associated with a stressed syllable and the second indicia is associated with an unstressed syllable.

10. The system of claim 1 wherein the stress pattern includes at least three integers, wherein a first integer is associated with a primary stressed syllable, a second integer is associated with an unstressed syllable, and a third integer is associated with a secondary stressed syllable.

11. The system of claim 1 wherein the controller is configured to:
access a plurality of phrase sources each including a plurality of phrases, wherein each plurality of phrase includes at least one word;
identify a stress pattern for each of the plurality of phrases;
calculate a frequency of occurrence of each phrase in the plurality of phrases; and
input the identified plurality of phrases, the associated frequency of each phrase, and the associated stress pattern of each phrase into the database.

12. A system for identifying a desired phrase, the system comprising:
a controller;
a memory coupled to the controller, wherein the memory is configured to store program instructions executable by the controller;
wherein in response to executing the program instructions, the controller is configured to:
receive user-defined criteria through a user interface;
determine a stress pattern associated with the user-defined criteria, wherein the stress pattern indicates a relative stress of each syllable of the user-defined criteria, wherein the user-defined criteria includes a submitted phrase, wherein the submitted phrase includes more than one word,
wherein at least one of one syllable articles, one syllable conjunctions, one syllable prepositions, one syllable pronouns, one syllable contractions, and one syllable interjections in the submitted phrase are unstressed in the stress pattern;
access a database including a plurality of phrases, wherein each phrase includes at least one word, wherein each phrase is associated with a stress pattern;
select a matching phrase from the plurality of phrases within the database, wherein the matching phrase is associated with a stress pattern that matches the received user-defined criteria; and
display the matching phrase on the user interface.

13. The system of claim 12 wherein one syllable conjunctions, one syllable prepositions, and one syllable pronouns in the phrase are unstressed in the stress pattern.

14. The system of claim 12 wherein one syllable contractions, and one syllable interjections in the phrase are unstressed in the stress pattern.

15. The system of claim 12 wherein the user-defined criteria includes a submitted phrase, wherein the submitted phrase includes at least one word.

16. The system of claim 12 wherein the controller is configured to calculate a ranking for the matching phrases, wherein the ranking is based on a frequency of occurrence of the matching phrase in the database.

17. The system of claim 12 wherein the user-defined criteria includes a rhyme type, wherein the rhyme type is selected from the group consisting of perfect, additive, family, subtractive, assonance, and consonance.

18. The system of claim 12 wherein the user-defined criteria is an auditory sample, wherein the controller is configured to convert the auditory sample into musical instrument digital interface values to determine the stress pattern of the user-defined criteria.

19. The system of claim 12 wherein the controller is configured to:
access a plurality of phrase sources each including a plurality of phrases, wherein each plurality of phrase includes at least one word;
identify a stress pattern for each of the plurality of phrases;
calculate a frequency of occurrence of each phrase in the plurality of phrases; and
input the identified plurality of phrases, the associated frequency of each phrase, and the associated stress pattern of each phrase into the database.

20. A system for identifying a desired phrase, the system comprising:
a controller;
a memory coupled to the controller, wherein the memory is configured to store program instructions executable by the controller;
wherein in response to executing the program instructions, the controller is configured to:
receive user-defined criteria through a user interface, wherein the user-defined criteria includes a stress pattern for at least a portion of a phrase and a rhyme type, wherein the rhyme type is selected from the group consisting of perfect, additive, family, subtractive, assonance, and consonance;
access a database including a plurality of phrases, wherein each phrase includes at least one word, wherein each phrase is associated with a stress pattern;
select a matching phrase from the plurality of phrases within the database, wherein the matching phrase is associated with a stress pattern that matches the received user-defined criteria; and
display the matching phrase on the user interface.

* * * * *